United States Patent [19]

Artom

[11] 3,902,165

[45] Aug. 26, 1975

[54] HIGH-SPEED PCM DATA-TRANSMISSION SYSTEM

[75] Inventor: Auro Artom, Torin, Italy

[73] Assignee: CSELT Centro Studi e Laboratori Telecomunicazioni, Torin, Italy

[22] Filed: Apr. 29, 1974

[21] Appl. No.: 465,282

[30] Foreign Application Priority Data

Apr. 30, 1973 Italy .................................. 68195/73

[52] U.S. Cl. ....... 340/172.5; 179/15 BL; 179/15 A; 333/18

[51] Int. Cl. .............................................. H04j 3/12

[58] Field of Search ........ 179/15 A, 15 AT, 15 AD, 179/15 BL, 15 AE; 340/172.5; 333/18; 328/163; 307/103

[56] References Cited

UNITED STATES PATENTS

| | | | |
|---|---|---|---|
| 3,271,703 | 9/1966 | Kaenel | 333/18 |
| 3,368,167 | 2/1968 | Graham | 333/18 |
| 3,566,271 | 2/1971 | Whang | 333/18 |
| 3,706,076 | 12/1972 | Schuster | 340/172.5 |
| 3,803,362 | 4/1974 | Frannea | 179/15 BL |

*Primary Examiner*—Ralph D. Blakeslee
*Attorney, Agent, or Firm*—Karl F. Ross; Herbert Dubno

[57] ABSTRACT

Several subscriber stations equipped with data terminals, adapted to send out and receive code words at different but harmonically interrelated rates, selectively communicate with one another via at least one central office and assigned PCM channels, each station being linked with its central office through a two-way analog-type signal path which includes an incoming and an outgoing branch terminating in respective baseband modems at the subscriber end and at the central-office end. A memory at the central office stores information relating to the transmission rates and line characteristics of the several signal paths served thereby. Three quarters of each code word are reserved for message bits, the fourth quarter being allocated to service bits. A subscriber wishing to establish a connection transmits, via the associated outgoing branch, to the central office a service code identifying that subscriber; the central office thereupon emits a pair of command signals, based upon the received code and the stored information, to select a matching filter circuit in a compatible equalizer section for insertion in series with that outgoing branch. A confirmation signal from the central office sets a clock circuit at the calling subscriber station to a selected operating speed, less than the fixed transmission rate of that station, preparatorily to the dialing of the number of the called subscriber; upon the establishment of a data link via the central office to the called station, the corresonding clock circuit thereof is synchronized with that of the calling station by a similar code.

12 Claims, 4 Drawing Figures

HIGH-SPEED PCM DATA-TRANSMISSION SYSTEM

FIELD OF THE INVENTION

My present invention relates to a system for the transmission of data at high speed via a telecommunication network of the pulse-code-modulation (PCM) type enabling the establishment of a multiplicity of simultaneous connections between several outlying stations (referred to hereinafter, for convenience, as "subscriber stations") served by one or more central offices.

BACKGROUND OF THE INVENTION

In commonly owned application Ser. No. time-division-multiplex 453,546, filed by me jointly with Carlo Demichelis on 21 Mar. 1974, there has been disclosed a time-sharing PCM telecommunication system in which the lines of a telephone network are used as signal paths between a central office or exchange and the associated subscribers, this system enabling selective changeover between data transmission and voice communication. The prior application makes reference to U.S. Pat. Nos. 3,749,839, 3,749,842 and 3,713,106 relating to PCM transmission systems of the time-diuision-multiplex (TDM) type; according to the last-mentioned patent, for example, a recurrent frame is divided into a multiplicity of time slots each containing a plurality of bits, specifically 32 time slots of eight bits each sent at a speed of 2.048 Mbits per second. This speed is in line with CCITT recommendations prescribing, inter alia, such harmonically interrelated operating speeds as 48, 9.6 and 2.4 kbit/sec.

OBJECTS OF THE INVENTION

The general object of my present invention is to provide a system capable of transmitting data at high rates, similar to those just referred to, with or without possible switchover to voice communication as disclosed in the aforementioned prior application.

A more particular object is to provide means in such a system for improving the quality of data transmission over subscriber lines ser ed by a central office, taking into account different transmission rates and/or impedance criteria of such lines (e.g. in the case of signal paths of different lengths).

Another object of my invention, allied with the preceding one, is to provide means affording a subscriber a choice among several operating speeds related to the predetermined transmission rate of his station.

SUMMARY OF THE INVENTION

In accordance with my present invention, a two-way signal path extending from a subscriber station to a central office has an outgoing branch and an incoming branch adapted to be respectively coupled through an interface unit — preferably a baseband modem — to a signal-receiving input line and a signal-transmitting output line of a central processor, e.g. with the aid of a conventional line concentrator/expander. The interface unit includes an equalization network with several band-pass filters selectively insertable in series with the outgoing branch of a signal path between the latter and the signal-receiving input line of the processor, the selection of a suitable filter circuit being performed by processor-controlled routing means in accordance with the impedance criteria (i.e. attenuation and phase delay) of the signal path involved and/or with the transmission rate of the subscriber station connected to that signal path. Thus, a memory in the processor may store rate and impedance information which is read out, in response to an identification signal from the subscriber, in order to instruct the routing means to select a filter circuit which conforms as nearly as possible to the impedance criteria of the subscriber line, or at least of its outgoing branch, within a frequency band compatible with the transmission rate of an active subscriber communicating with the central office.

According to another feature of my invention, I provide at least some stations with subscriber-operated means for selecting one of several operating speeds, related to the transmission rate, and for indicating that selection to the processor via a speed code sent out prior to the establishment of a data link via an assigned PCM channel to another station.

Since the selection of a filter circuit in the equalizer takes place only after the reception of the identification signal by the processor, this signal may be somewhat attenuated in transversing an all-pass equalizer section normally connected to the input line of the processor. Such attenuation, however, is of little significance as the code word carrying the identification signal is devoide of message bits to be transmitted to a distant station. Thus, the signal referred to is constituted by ancillary bits contained in a predetermined service portion of a code word or "format" distinct from the data portion carrying the message bits; in accordance with a further feature of my invention, such format is divided into a number of message-bit positions, occupying a predetermined fraction (preferably three fourths) of the format, and service-bit positions, occupying the remainder thereof. Advantageously, the bits are grouped in octets; with a 32-bit format, therefore, three octets are allocated to message bits and one octet is reserved for the service bits. Such service bits may also form the aforementioned speed code as well as synchronizing signals, indicating the stop or start of a format, and redundancies serving for error detection as is well known per se.

With the message bits concentrated in three quarters of a code word, the bit rate in the output of a data terminal at the subscriber station (referred to hereinafter as data cadence) may be up to three-fourths that of the transmission rate. It will thus be convenient to select an operating speed equal to a fractional value (specifically three-fourths) of the transmission rate, or to a submultiple of that fractional value, this operating speed either being identical with the data cadence in the case of a synchronized data terminal or representing an upper limit for that cadence in the case of a nonsynchronized terminal. In the latter instance, as will be shown hereinafter, minor increases of the data cadence beyond that upper limit may be tolerated if the service portion of a format provides a margin for the overflowing bits.

The speed transmitted to the central office by a calling subscriber, upon initiation of a call, is advantageously retransmitted (possibly in modified form) to that subscriber before the start of data-transmission as a confirmation signal adjusting a clock circuit at that station to the selected operating speed. This clock circuit forms part of a timer which also generates pulses controlling the sending and receiving of code words at the predetermined transmission rate individual to the calling station. Furthermore, upon extension of the call the desired remote station, the latter also receives e speed code from the processor to adjust its clock rcuit in an analogous manner; the transmission rates the two stations need not be identical but should be ımpatible with the common operating speed, i.e. be ıt less than four-thirds (in the specific instance here ınsidered) that operating speed. Thus, transmission tes of 64, 12.8 and 3.2 kbit/sec are compatible with ıerating speeds of 48, 9.6 and 2.4 kbit/sec, respec-'ely, or submultiples thereof.

The harmonic relationship among the several operat-g speeds selectable at a subscriber station, and among e various transmission rates that must be accommo-ıted by the interface unit of the central processor, al-ws the timing means at the subscriber stations as well similar timing means at the central office to be real-ed with the aid of simple logical circuitry such as a aster clock and a binary frequency divider with sev-al stage outputs generating the desired clock-pulse ains. Also, as will be shown hereinafter, this arrange-ent enables the transmitted formats to be divided into ell-defined data and service portions regardless of the lected operating speed.

BRIEF DESCRIPTION OF THE DRAWING

The above and other features of my invention will ıw be described in detail with reference to the accom-ınying drawing in which.

SPECIFIC DESCRIPTION

Figure 1:
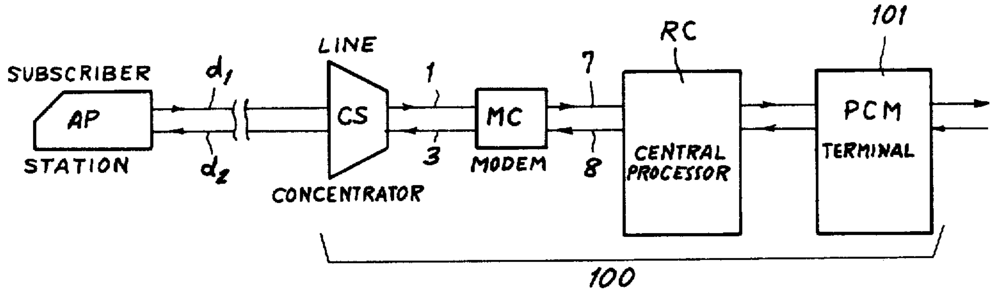
FIG. 1 is a block diagram showing the principal parts a central office and of a subscriber station in a data-ansmitting system according to my invention.

In FIG. 1 I have shown an outlying subscriber station P served by a central office or exchange 100 which cludes processor RC and a PCM terminal 101. Sta-ın AP is linked with central office 100 via a signal ıth comprising a pair of two-wire lines, namely an out-ıing line $d_1$ and an incoming line $d_2$ terminating at a ıe concentrator CS of conventional construction. ıis line concentrator funnels the traffic from a multi-icity of subscriber stations, arriving over respective ıtgoing signal-path branches $d_1$, to a reduced number local lines 1 extending to respective baseband odems MC (only one shown) serving as an interface ıit for processor RC; for traffic in the opposite direc-ın, component CS works as a line expander linking e several modems MC by way of respective local lines to a multiplicity of incoming signal-path branches $d_2$ seen from the associated subscriber stations. Each odem MC works into an input line 7 of central pro-ssor RC and can be reached from that processor rough an output line 8 thereof.

Modem MC, which together with line concentrator S forms part of the central office 100, has a counter-ırt M (FIG. 2) at the subscriber station AP. The two odems, when operatively interlinked through line ıncentrator CS, serve to convert digital signals gener-ed within the subscriber station or within the central office into analog signals and vice versa. The analog signals are preferably an alternating voltage substantially free from d-c components and capable of passing without significant distortion through an equalizer EQ (FIG. 3) forming part of the modem MC. Upon the establishment of a data link between station AP and a similar subscriber station not shown, the outgoing formats reconstituted by modem MC on line 7 are entered in an assigned time slot of a succession of PCM frames, in the conventional manner, by terminal 101 for transmission to the other station. If the latter is served by another central office, the data link includes a PCM/TDM transmission path between the two central offices; in the event of communication between stations served by the same central office 100, such transmission merely involves the transfer (through suitable delay means) of bits from one time slot or PCM channel to another. Thus, as far as my present invention is concerned, it is immaterial whether the system includes only one central office 100 or several such central offices interconnected by trunk lines.

In the more detailed diagrams of FIGS. 2 and 3, described below, connections shown for simplicity as single lines (and referred to as leads) may be representative of conductor multiples as needed for the concurrent transmission of several signal voltages.

Figure 2:
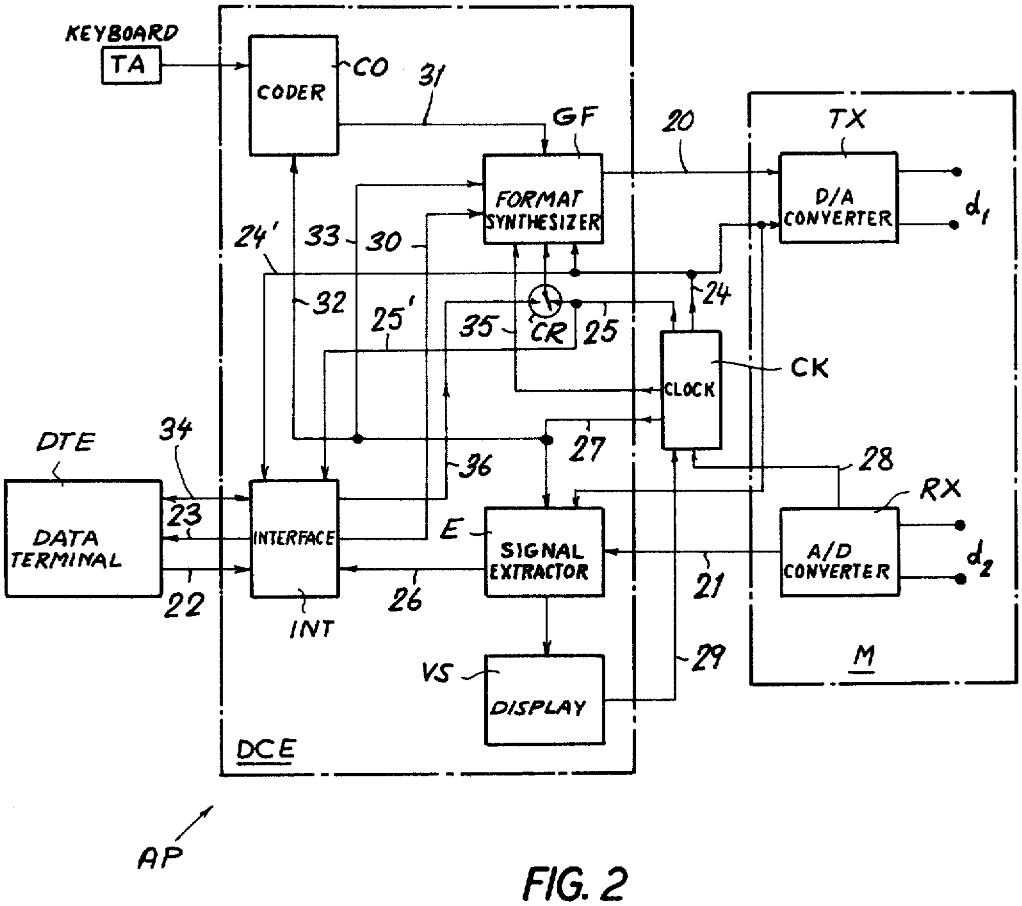
FIG. 2 is a more detailed circuit diagram of the sub-riber station of FIG. 1.

FIG. 2 shows details of the subscriber station AP which comprises, in addition to the aforementioned baseband modem M, a data terminal DTE and a processor generally designated DCE. Terminal DTE may include one or more data sources, e.g. instruments whose readings are to be transmitted to a remote station, along with conventional equipment for translating such readings into data words read out at a predetermined cadence and for recording incoming data words at a similar cadence. A keyboard TA serves for the initiation of a call by the subscriber through the transmission of a start signal and, thereafter, of the number of a called subscriber to a coder CO in processor DCE as more fully described below. Coder CO works via a line 31 into a format synthesizer GF which generates the outgoing code words and translates them into bipolar pulse combinations changeable into a balanced alternating voltage on outgoing branch $d_1$ by means of a digital/analog converter TX in modem M; this converter, including the usual filter networks, is linked with synthesizer GF through a line 20 which it conductively decouples from the line $d_1$. Data terminal DTE communicates with an interface unit INT in processor DCE over several lines, i.e. a connection 22 for transmitting data to the interface unit, a connection 23 for receiving data from that unit, and a two-way link 34 for the exchange of synchronizing signals and other instructions. Unit INT feeds the received data words by way of a line 30 into synthesizer GF and receives arriving data words from the central office over incoming branch $d_2$, an analog/digital converter RX in modem M including filtering, equalizing and conductive-decoupling means, a line 21, a signal extractor E and a line 26. Extractor E, in a manner well known per se, checks for transmission errors on the basis of recurrent redundancy bits, recognizes the incoming formats, detects their starting codes and decodes their service bits to reproduce the information conveyed thereby on a display indicator VS such as an oscilloscope screen on the console of equipment DTE. Device VS includes the usual sweep circuits which must be synchronized with the cadence of the incoming formats; the corresponding sync signals, contained in the service portions of the formats, are also translated into pulses appearing on an output lead 29 of device VS to control a local clock in a timing circuit CK. Timer CK, which also receives operating-speed information directly from incoming converter RX over a line 28, has several output leads 24, 25, 27 and 35. Lead 24 is pulsed to step the synthesizer GF and the converter TX in conformity with the fixed transmission rate of station AP; a branch 24' of that lead extends to interface unit INT to drive a frequency divider therein for establishing the selected operating speed of data terminal DTE in the event of synchronous operation. Lead 25 carries timing pulses at the selected operating speed to synthesizer GF and also has a branch 25' which extends to interface unit INT for deriving that operating speed, again in the case of a synchronized terminal, from the aforementioned frequency divider. Lead 25 passes through a switch CR which, in its alternate position designed for asynchronous operation, conveys to synthesizer GF a set of timing pulses at the data cadence of equipment DTE, these pulses being carried on a lead 36 emanating from unit INT. Lead 27 carries pulses which count the number of bit positions per format, e.g. 32, to insure proper scanning of the incoming code words by the extractor E; extensions 32 and 33 of this lead terminate at coder CO and synthesizer GF, respectively. Lead 35 originates at a nonillustrated counter in timer CK, stepped by the pulses on lead 25, and is energized upon a count of three fourths of the number of bit positions per format, e.g. 24 in the specific example here considered, thus measuring the period allotted to message bits from data terminal DTE.

Figure 3:
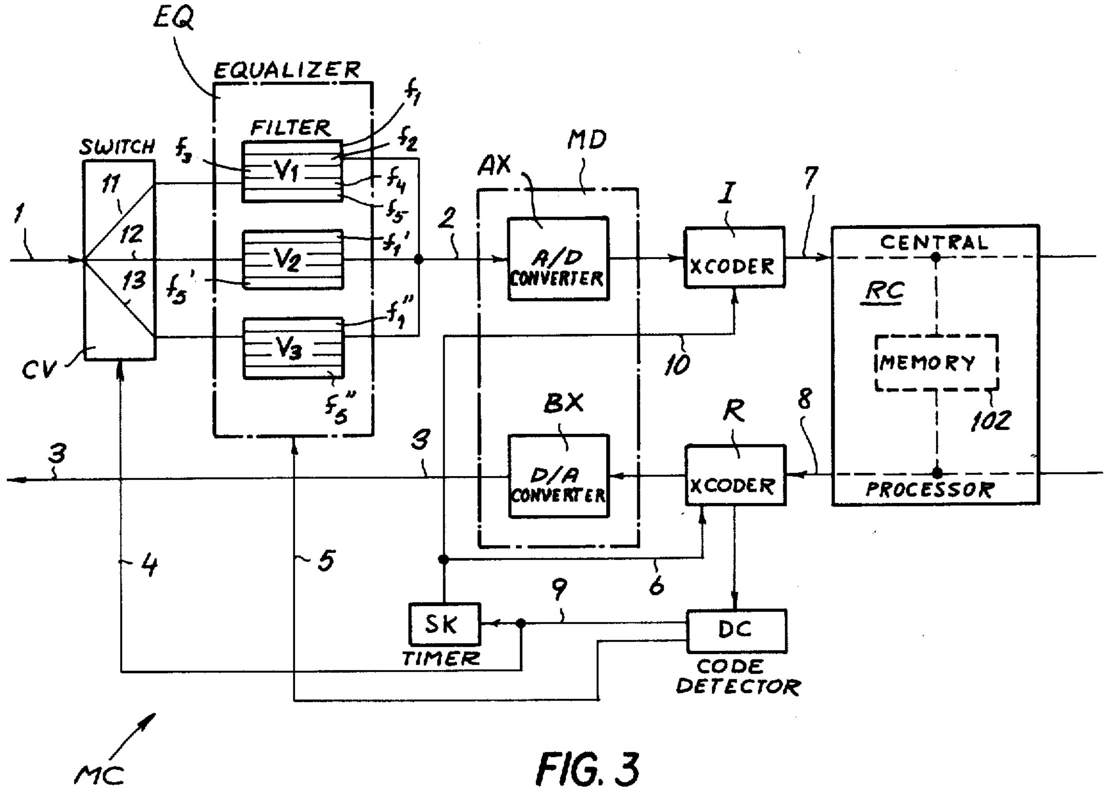
FIG. 3 is a similar circuit diagram for part of the cen-al office of FIG. 1 showing a processor coupled by an terface unit to a signal path extending from the sub-riber station of FIG. 2.

Reference will now be made to FIG. 3 for a detailed description of exchange modem MC. A unit MD in that modem, similar to component M of FIG. 2, comprises an analog/digital converter AX for signals arriving over line 1 and a digital/analog converter BX for signals sent out over line 3. Converter AX, restoring the bipolar pulse form of the output of synthesizer GF, works into input line 7 of central processor RC by way of a transcoder I which re-establishes the original binary code words. In an analogous manner, a transcoder R is inserted in output line 8 delivering code words from processor RC in bipolar form to converter BX which is similar to converter TX of station AP. Units I and R are stepped, by way of respective leads 6 and 10, from a timing circuit SK which in turn may be driven from a nonillustrated master clock common to all the modems MC; however, the bit rates on lines 7 and 8 are controlled by the clock of PCM terminal 101 and do not necessarily correspond to the transmission rate established by timer SK.

Transcoder R contains a buffer register for temporarily storing the bits of any code word delivered over the associated PCM channel in a succession of frames, i.e. 32, 48 or 64 bits if the code words consist of 4, 6 or 8 octets. This unit also serves for the readout of code combinations from the service portion of a stored word to a code detector DC, to insert synchronizing bits into that service portion and to discriminate against blank words devoid of data bits, as more fully described below. Code detector DC, having output leads 5 and 9, recognizes speed and line-impedance information read out from a memory 102 in processor RC and preserves that information for the duration of a call.

An equalizing network EQ is divided into several (here three) subsections $V_1$, $V_2$ and $V_3$ each containing a multiplicity of filter circuits $f_1 - f_5, f'_1 - f'_5$ and $f''_1 - f''_5$ individually connectable between incoming line 1 and an extension 2 thereof leading to converter AX. A routing switch CV, connected to a branch of outlead lead 9 of register DC, selectively establishes one of three paths 11, 12 and 13 leading from line 1 to equalizer sections $V_1$, $V_2$, $V_3$, respectively, each of these paths being connected in parallel to the input ends of all the associated filter circuits $f_1 - f_5, f'_1 - f'_5$ or $f''_1 - f''_5$. Output lead 5 of code detector DC extends to equalizer EQ and controls a set of selector switches therein, not shown in detail, for completing the connection between lines 1 and 2 through one of the filters in the equalizer section to which access is given by the switch CV.

The routing of the incoming signals through equalizer EQ via switch CV is controlled by a command delivered on lead 9, in response to a speed code picked up by detector R, which also determines the clock-pulse frequency of timer SK. The choice of a particular filter within the selected equalizer section depends on information stored in memory 102 regarding the transmission rate and line characteristics of the signal path $d_1$, $d_2$ connected via concentrator CS to lines 1 and 3 of modem MC; this information is read out from memory 102 into transcoder R in response to an identification code emitted by station AP upon actuation of a start button on keyboard TA (FIG. 2) when the subscriber initiates an outgoing call or responds to an incoming one.

Thus, the initiation of a call from station AP proceeds as follows:

The subscriber, by depressing the start button, summons the line concentrator CS in the usual way to seize an available link link 1, 3 terminating at the corresponding modem MC. It will be assumed that, in the idle state of that modem, routing switch CV gives access to an all-pass section of equalizer EQ which may be constituted by one of the illustrated filter circuits or by a bypass not shown. It will also be assumed that the timer SK of modem MD is initially set to a predetermined transmission rate and that the identification code emitted by station AP at this instant is so constituted as to be properly recognizable by a logic circuit in processor RC, serving as an address unit for memory 102, even if the transmission rate of station AP is different from (but harmonically related to) the one established by timer SK.

The processor now reads out the pertinent rate and impedance information, stored in memory 102, as part of the service portions of otherwise empty data words picked up by transcoder R and sent on to detector DC. The latter, in response to the information concerning the transmission rate of transmission AP, correspondingly resets the timer SK via lead 9 and, by way of an extension 4 of that lead, instructs the switch CV to route the incoming signals to the appropriate section of equalizer EQ whose filter circuits have pass bands compatible with that rate. Moreover, on the basis of the impedance information received substantially at the same time, code detector DC energizes its output lead 5 in a manner causing the selector switches of equalizer EQ to insert a matching filter circuit of the connected section between the lines 1 and 2 in series with the outgoing branch $d_1$.

The rate code, recognized by converter RX (FIG. 2), ıuses the energization of its output lead 28 in a manɜr synchronizing the transmission-controlling clock of mer CK, i.e. the source of stepping pulses on lead 24, ith the timer SK of modem MC. This operation also ·ings the counting pulses on lead 27 into step with the ıtput of timer SK in FIG. 3 so that signal extractor E made receptive to incoming formats from central ofɔe 100.

Coder CO is now enabled to deliver to synthesizer F over line 31, for introduction into a service portion : a format issuing from that synthesizer, certain bit ɔmbinations characterizing that format as a blank ord devoid of message bits in its data portion. Thus, ır example, the format may have 32 bit positions of hich the last 8 constitute the service portion as meaıred by the final quarter of a train of 32 counting ulses on leads 27, 32 and 33. On or more such blank ords, transmitted over outgoing branch $d_1$, inform the rocessor RC that synchronization has been achieved, ıd elicit from that processor an answer-back signal hich is detected by the extractor E and causes energiıtion of the display device VS to invite the subscriber › use his keyboard TA for dialing the call number of ıe remote station with which he wishes to communiıte. These dial pulses are preceded or accompanied y a speed signal informing the processor of the operatıg speed selected by the subscriber; again, only the ɜrvice portions of formats issuing from synthesizer GR re used for the corresponding codes emitted by unit 'O. Since the date transceiver DTE is not in use at that ·age, the relative timing of that speed signal and the ial pulses is not critical.

Upon completion of the dialing phase, and during the xtension of the call to the remote station, the procesɔr RC retransmits the speed signal (possibly as a modied code) to the calling station AP and also, if the alled station is free, to the latter station via PCM terıinal 101. The retransmitted speed code acts as a conrmation signal and is picked up by extractor E to actute the display device VS which, in turn, emits on lead 9 a signal adjusting the variable part of timer CK (e.g. binary frequency divider driven by the fixed·equency clock thereof) to the selected operating ɔeed. A mark displayed by device VS informs the subɜriber that data transmission may start; leads 25 and 5 in the output of timer CK are now energized in the ıythm of the selected operating speed as more fully escribed below with reference to FIG. 4. The confirıation signal sent back by the central office may be acompanied by digital codes reproducing on indicator 'S the dialed call number to verify the establishment f the desired data link.

The response of the remote station is the same as that f station AP in the event of a call coming in from ıodem MC over signal path $d_1$, $d_2$. In that event the ıbscriber may be conventionally alerted by a bell or uzzer and will then operate his start button to identify ıe station in the aforedescribed manner in order to ynchronize the timer CK with the timer SK of the ıodem MC connected thereto. Upon such synchroniıtion, the called subscriber receives from the procesɔr a format containing the speed code indicative of the perating speed chosen by the calling party. This speed ode may also be accompanied by digital codes resultıg in the display, on device VS, of the call number of that party so that the subscriber may decide on whether or not to accept the call.

The arrival of the speed signal at extractor E has the same effect as in the case of the calling station, i.e. it resets the variable clock circuit of timer CK and displays a mark inviting the subscriber to begin data transmission.

After the exchange of data is completed, the call is terminated and the respective modems MC are released in the usual manner.

Figure 4:
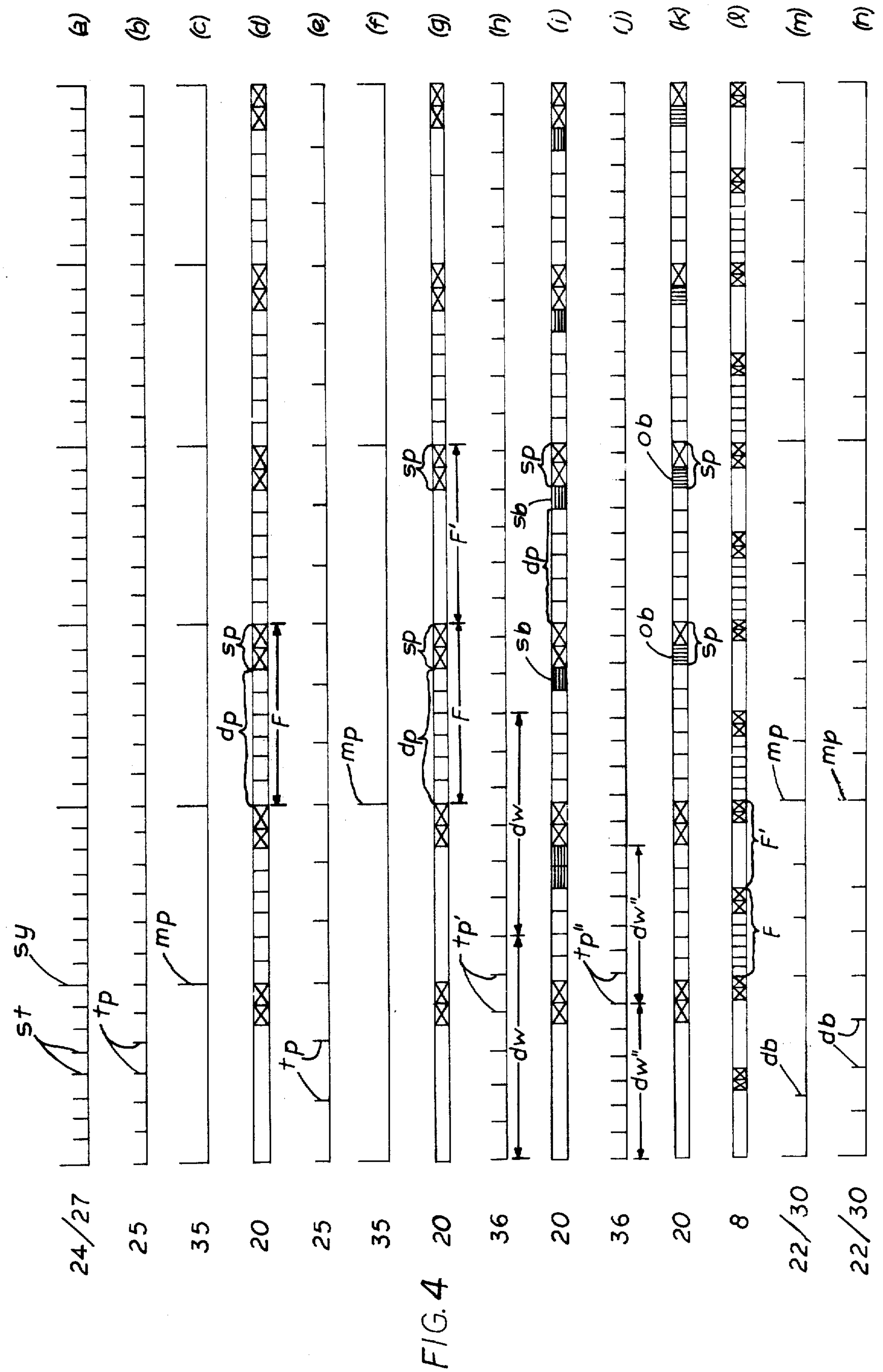
FIG. 4 is a set of graphs relating to the operation of e system of FIGS. 1 – 3.

I shall now describe, with reference to FIG. 4, several possible modes of operation of the described system.

Graph (*a*) of FIG. 4 shows the stepping pulses *st* appearing on lead 24 as generated by timer CK in the rhythm of the fixed transmission rate of station AP; the start of a counting cycle is marked by a synchronizing pulse on lead 27, the interval between two such pulses thus measuring a format generated by synthesizer GF. For the sake of simplification, only eight counting pulses per format have been illustrated. Each counting pulse, therefore, represents at least four bit positions under the conditions assumed above.

Graph (*b*) relates to the case of a selected operating speed equaling three-fourths the transmission rate, as represented by six timing pulses *tp* on lead 25. With a synchronously operating data terminal DTE, these timing pulses coincide with respective bits *db* emitted by that terminal on line 22 — cf. graph (*m*) — and delivered to synthesizer GF via line 30. Lead 35, energized upon a count of six timing pulses *tp* by a marking pulse *mp* as shown in graph (*c*) allows all 24 bits (symbolized by six pulses) of a data words to reach the synthesizer GF for temporary storage in a nonillustrated buffer register from which they are subsequently read out on line 20, graph (*d*), at the higher transmission rate so as to fit into the data portion *dp* of a format F also having a service portion *sp*. Under these circumstances, therefore, the data bits are distributed throughout the entire format portion allotted to them and no bits are lost.

Graph (*e*) relates to the case in which a lower operating speed, here half the previous one, has been selected. The timing pulses *tp* on lead 25 now require two format cycles in order to reach the count of six (corresponding to 24 bit positions) so that marking pulse *mp* on lead 35, graph (*f*), coincides only with every other synchronizing pulse *sy* on graph (*a*). The loading of the buffer register of synthesizer GF with the 24 data bits accommodated by one format is therefore completed only in every other cycle so that message formats F alternate with blank formats F' on line 20 as shown on graph (*g*). These blank formats contain only service bits in a portion *sp* thereof.

Graph (*h*) relates to the case of a nonsynchronized data terminal which, with switch CR (FIG. 2) in its alternate position, sends its own timing pulses *tp'* to synthesizer GF over lead 36. A 24-bit data word *dw* occupies the major part of a counting period defined by marking pulses *mp*, graph (*f*) it being assumed in this instance that the selected operating speed is again three eights of the transmission rate. The data bits are accommodated in the data portions *dp* of successive formats, graph (*i*), in a somewhat irregular manner leaving voids in certain bit positions preceding the service portions *sp;* these voids are filled in synthesizer GF by supplemental bits sb as taught in the aforementioned U.S. Pat. No. 3,749,839. In this case, of course, the beginning or end of each data word within a format must be clearly indicated by a characteristic bit combination.

Graph (*j*) represents another instance of asynchronous operation in which, however, the timing pulses *tp''* measuring a 24-bit data word *dw* have a higher cadence so that the number of data bits per format exceeds the number of bit positions (here 24) allocated therefor in the data portion *dp*. In some formats, therefore, supernumerary or overflow data bits are accommodated in a service portion *sp* of a format as indicated at *ob* in graph (*k*).

Graph (*l*) represents the case in which message formats F alternate with blank formats F' in the output 8 of processor RC (FIG. 3), as will occur when the operating speed is low with reference to the transmission rate of either or both interconnected stations as has been described in connection with graph (*g*). In that case the transcoder R of modem MC rejects the arriving blank formats F', in response to their characteristic service bits, and allows only message format F to reach the modem M of the associated subscriber station. The redistribution of the incoming data bits at that station, in the rhythm of the data cadence of its terminal DTE, may take place through a non-illustrated buffer register in interface unit INT.

Graphs (*m*) and (*n*) afford a comparison of a mode of operation of a fully synchronized data terminal and an asynchronously driven data terminal of the start-stop type. In the first instance, the data bits *dp* appearing on lines 22 and 30 are uniformly distributed throughout an operating period which is here assumed to be the same as that shown in graph (*f*), i.e. the reciprocal of an operating speed equaling three-eights the transmission rate. In the second instance the data-bit sequence terminates within each operating period before the occurrence of the next making pulse *mp*. In both cases, however, the resulting formats will be as shown in graph (*g*).

It will thus be seen that I have disclosed a system in which a subscriber has a choice of operating speeds and, in some instances, of data cadences (i.e. working speeds of the terminal equipment DTE) lower or possibly slightly higher than a selected operating speed, and wherein differences between the data cadences of interconnected subscriber stations are no obstacle to a full exchange of data. Moreover, such exchange takes place under conditions of minimum distortion by virtue of the automatic adaptation of the filter circuits of equalizer EQ to the peculiarities of different signal paths.

I claim:

1. A data-transmission system comprising:

a central office provided with signal-receiving means and signal-transmitting means;

a plurality of outlying stations each provided with data-communication equipment and with a two-way signal path having an outgoing branch and an incoming branch extending from said equipment to said central office, the transmission paths associated with at least some of said stations having substantially different impedance criteria;

a PCM terminal at said central office coupled to said signal-receiving and signal-transmitting means for establishing data links between stations;

routing means at said central office operable to connect the outgoing and incoming branches of any signal path to said signal-transmitting and signal-receiving means, respectively, preparatorily to the establishment of a data link between a first station associated with the signal path and a second station reachable through said PCM terminal, said routing means including an equalization network with a plurality of filter circuits selectively insertable in series with said outgoing branch, said filter circuits substantially conforming to impedance criteria of different signal paths to minimize distortion; and processing means at said central office responsive to an identification signal from said first station to operate said routing means for insertion of a conforming filter circuit prior to inception of data transmission between said first and second stations.

2. A system as defined in claim 1 wherein said signal path is adapted for the transmission of analog signals and is provided at each end with a respective baseband modem for the conversion of binary code words into analog signals and vice versa.

3. A system as defined in claim 2 wherein each of said stations is provided with first timing means for establishing a predetermined transmission rate for outgoing signals and an operating speed at a fractional value of said transmission rate for the processing of data words leaving and entering said equipment, the transmission rates of at least some of said stations being different from but harmonically related to one another, said central office being provided with second timing means synchronizable with said first timing means at said transmission rate for processing code words arriving over and destined for a signal path connected thereto.

4. A system as defined in claim 3 wherein said central office is provided with memory means storing information on the impedance criteria and transmission rates of all signal paths connectable thereto and for reading out said information in response to said identification signal, said equalization network being divided into a plurality of sections containing respective groups of said filter circuits compatible with different transmission rates, said routing means including switch means responsive to transmission-rate information from said memory means for giving access to a section of said network compatible with the transmission rate of said first station and selector means responsive to impedance information from said memory means for inserting a conforming filter circuit of said compatible section in series with said outgoing branch.

5. A system as defined in claim 3 wherein said first timing means at said first station is adjustable for selecting one of several harmonically interrelated operating speeds, said first station being provided with a signal generator for emitting a speed code indicative of the selected operating speed to said central office for retransmission to said first station as a confirmation signal and for transmission to said second station, said first timing means being connected to said incoming branch for adjustment to the selected operating speed by said confirmation signal.

6. A system as defined in claim 5 wherein said signal generator is connected to said first timing means and to said equipment for synthesizing a succession of code words each consisting of a series of first bit positions allotted to message bits from said equipment and a series of second bit positions allotted to service bits, said first station further including selector means connected to said generator for producing said speed code in said second bit positions of a code word devoid of message bits in said first bit positions.

7. A system as defined in claim 6 wherein said first timing means includes a source of clock pulses counting three fourths of the total number of bit positions per code word for separating said first and second bit positions in the output of said generator.

8. A data-transmission system comprising:

a central office provided with signal-receiving means and signal-transmitting means;

a plurality of outlying stations each provided with data-communication equipment and with a two-way signal path having an outgoing branch and an incoming branch adapted for the transmission of analog signals;

a first baseband modem linking said equipment with said signal path for converting binary code words from said equipment into analog signals transmitted over said outgoing branch and for converting analog signals received over said incoming branch into binary code words for said equipment;

a second baseband modem connected to said signal path at said central office for converting analog signals from said outgoing branch into binary code words for said signal-receiving means and for converting binary code words from said signal-transmitting means into analog signals transmitted over said incoming branch;

first timing means at each of said stations for establishing a transmission rate for outgoing code words, said transmission rate being different for at least some of said stations;

a PCM terminal at said central office coupled to said signal-receiving and signal-transmitting means for establishing data links between stations;

routing means at said central office operable to connect the outgoing and incoming branches of any signal path to said signal-transmitting and signal-receiving means, respectively, preparatorily to the establishment of a data link between a first station associated with a given signal path and second station reachable through said PCM terminal, said routing means including an equalization network with several sections selectively insertable in series with said outgoing branch to match the transmission rate of said first station;

processing means at said central office for operating said routing means in response to an identification signal from said first station to insert a compatible section of said network in series with said outgoing branch prior to inception of data transmission between said first and second stations; and second timing means at said central office controlled by said processing means for operation in step with said first timing means.

9. A system as defined in claim 8 wherein said processing means includes a memory storing information on individual impedance criteria of different signal paths terminating at said central office, each of said sections including a plurality of filter circuits selectable by said routing means under the control of said memory for substantially conforming to the impedance criteria of a signal path having its outgoing branch connected to said signal-receiving means.

10. A system as defined in claim 8 wherein said first timing means includes an adjustable clock circuit for establishing an operating speed common to said first and second stations at a fractional value of their respective transmission rates for the processing of data words leaving and entering said equipment, each of said stations including a signal generator for synthesizing a succession of code words with a predetermined number of bit positions following one another at the respective transmission rate and for allocating certain of said bit positions to data bits from said equipment while reserving other of said bit positions for ancillary information including said identification signal.

11. A system as defined in claim 10 wherein said first timing means includes a pulsing circuit for counting a number of data bits, issuing from said equipment at a cadence determined by said operating speed, equal to the number of said certain of said bit positions and to fill a code word with said data bits upon completion of the count.

12. A system as defined in claim 11 wherein said operating speed is such a small fraction of the transmission rate of said first station that some of the code words originating at said second station are blanks devoid of data bits, said processing means including a descriminator for suppressing said blanks at an input end of the incoming branch of the signal path leading to said second station.

* * * * *